3,585,204
α,α-DIPHENYLPIPERIDINEACETIC ACIDS AND
CONGENERS
Robert W. Hamilton, Wilmette, Ill., assignor to
G. D. Searle & Co., Chicago, Ill.
No Drawing. Filed Sept. 19, 1968, Ser. No. 761,003
Int. Cl. C07d 29/24
U.S. Cl. 260—294       9 Claims

ABSTRACT OF THE DISCLOSURE

Preparation of the captioned compounds and their anti-algal, anti-germinant, anti-inflammatory, and anti-fungal properties are disclosed.

---

This invention relates to α,α-diphenylpiperidine-acetic acids and congeners, and to processes for the preparation thereof. More particularly, this invention provides new, useful, and unobvious chemical compounds of the formula

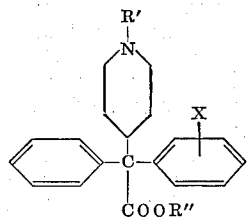

wherein R' represents hydrogen, alkyl, alkanoyl, optionally-halogenated benzoyl, benzyloxycarbonyl, or dialkylaminoalkyl; R" represents hydrogen, alkyl, or dialkylaminoalkyl; and X represents hydrogen or a halogen such as chlorine.

The alkyl constituents of the contemplated radicals are preferably of lower order, i.e., methyl, ethyl, propyl, butyl, isobutyl, sec.-butyl, tert.-butyl, pentyl neopentyl hexyl, isohexyl, or other monovalent, saturated, acyclic, straight- or branched-chain, hydrocarbon groupings of empirical formula $$-C_nH_{2n+1}$$

wherein $n$ represents a positive integer less than 8. Among the dialkylaminoalkyls referred to, those which in each instance include at least 1 carbon separating the nitrogen from the carbon through which the radical is attached are especially preferred, e.g., di(lower alkyl)-aminoethyl, 2 - di(lower alkyl)amino-1-methylethyl, di(lower alkyl) aminopropyl,etc.

The alkanoyls contemplated by R' are, like the alkyls described above, most desirably of lower order, and thus enformulated

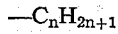

while the halogenated benzoyls contemplated by R' are defined by the formula

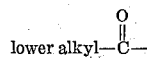

in which the halogen can be fluorine, chlorine, bromine, or iodine disposed ortho, meta, or para ad libitum with respect to the carbonyl.

Equivalent to the foregoing compounds, for the purposes of this invention, are corresponding acid addition salts of the formula

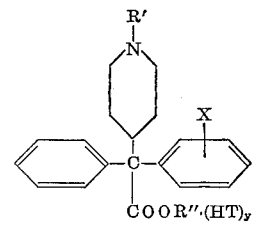

wherein R', R" and X retain the meanings previously assigned; T represents 1 equivalent of an anion—for example, chloride, bromide, iodide, nitrate, phosphate, sulfate, sulfanate, methyl sulfate, ethyl sulfate, benzenesulfonate toluenesulfonate, acetate, lactate, succinate, maleate, tartrate, citrate, gluconate, ascorbate, benzoate, cinnamate, or the like—which in combination with the cationic portion of a salt aforesaid, is neither biologically nor otherwise undesirable; and y represents a positive integer less than 4, its precise value being dependent upon the number of basic nitrogen atoms involved in salt formation.

The compounds to which this invention relates are useful by reason of their valuable biological properties. Thus, for example, they are anti-algal, anti-germinant, anti-inflammatory, and anti-fungal.

The anti-algal utility of the instant compounds is evident from the results of a standardized test whereby a sterile Bristol agar plate is inoculated with Chlorella vulgaris, approximately 5 mg. of compound is placed on the surface of the plate so as to cover a circle roughly 4 mm. in diameter, and the plate is incubated at 25° under artificial light for 5–7 days. A clear zone of inhibition signifies the utility in question. Copper sulfate serves as a reference standard.

The anti-germinant utility of the instant compounds is evident from the results of a standardized test whereby three 42.5-mm. (diameter) filter paper discs are stacked in each of two 60-mm. Petri dishes, each stack is moistened with 2 ml. of distilled water, 10 white clover (Trifolium repens—a representative dicotyledon) seeds are arranged atop each stack at approximately equal intervals around the periphery, approximately 5 mg. of compound is placed in the center of one seed circle (the other serves as control), the dishes are covered with glass lids and then incubated at room temperatures for 10 days, and germination in the control dish is thereupon compared with that in the dish containing seeds exposed to test compound.

The anti-inflammatory utility of the instant compounds is evident from the results of a standardized test for their capacity to inhibit the formation of granuloma tissue induced in adrenalectomized rats by implanted cotton. The procedure is a modification of one described by Dulin in Proc. Soc. Exp. Biol. Med., 90, 115 (1955). Male Sprague-Dawley rats weighing 180–220 gm. are adrenalectomized, and their drinking water is thereafter replaced by aqueous 0.86% sodium chloride supplemented during the first 24 hours by glucose q.s. 5%. On the day after the adrenalectomy, 4 pellets of dental cotton weighing 5–7 mg. apiece are separately, subcutaneously, and bilaterally implanted in the pectoral and dorsal lateral neck region of each animal, whereupon the prescribed dose (initially, 20 mg. intragastrically) of compound to be tested, dissolved or suspended in a vehicle consisting of 0.5 ml. of either corn oil or a mixture of 20 ml. of aqueous 0.86% saline with 1 drop of polysorbate 80, is administered intragastrically or subcutaneously to each of 3–6 animals. A like group of animals to which is identically and concurrently administered vehicle alone serves as controls. This treatment is repeated the next day. The day after that the animals are sacrificed; and the pellets, with associated granuloma tissue, are dissected, dried, and weighed. A compound is considered anti-inflammatory if the mean weight of granuloma tissue in the group of animals treated therewith, adjusted to compensate for variations in dissection technique, is significantly ($P \leq 0.05$) less than the corresponding weight in the control group. A total ($2 \times 0.25$ mg.) dose of 0.5 mg. of hydrocortisone, administered subcutaneously, prevents the growth of granuloma tissue in this test.

Further evidence of the anti-inflammatory utility of the instant compounds is provided by the results of a standardized test for their capacity to inhibit the edema induced in rats by injection of carrageenin. The procedure is a modification of one described by Winter et al., Proc. Soc. Exp. Biol. Med., 111, 544 (1962). Compound is administered subcutaneously or intragastrically, dissolved or suspended in 0.5 ml. of aqueous 0.86% sodium chloride, propylene glycol, a mixture of these vehicles, or corn oil, to each of 10 male rats weighing 100–130 gm. A like group of rats to which is identically and concurrently administered vehicle alone serves as controls. Precisely 1 hour later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the two hind feet in the group treated therewith, which is measured in arbitrary units 5 hr. after the carrageenin injection, is significantly ($P \leq 0.05$) less than the corresponding value (C) for the control group.

The anti-fungal utility of the instant compounds is evident from the results of standardized tests whereby sterile mycophil agar plates are inoculated with *Tricophyton mentagrophytes* or *Candida albicans*; approximately 5 mg. of compound is placed on the surface of each plate so as to cover a circle approximately 4 mm. in diameter; and the plates are incubated for 96 hr. at 25° without artificial light. Clear zones of inhibition signify the utility in question. Undecylenic acid and nystatin serve as reference standards.

Those skilled in the art will recognize that observations of activity in standardized tests for particular biological effects are fundamental to the development of valuable new drugs, both veterinary and human. Distinct from such applications, anti-germinant compounds serve as herbicides.

Preparation of the compounds of this invention proceeds by heating a diphenylacetonitrile of the formula

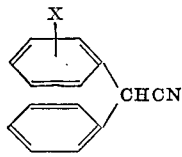

wherein X is defined as before, with sodium amide and then 4-chloropyridine in dioxan to give the corresponding pyridineacetonitrile

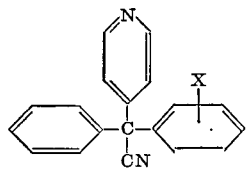

in which the cyano group is hydrolized by heating with concentrated sulfuric caid. The resultant pyridineacetamide is converted to the corresponding piperidineacetamide by dissolving in alcohol and hydrogenating in the presence of concentrated hydrochloric acid and platinum oxide catalyst. The amido group is thereupon hydrolized by heating with 48% hydrobromic acid, affording the corresponding piperidineacetic acid. N - methylation is effected by heating with a mixture of formic acid and formaldehyde. Alternatively, the piperidineacetic acid and an alkyl halide are heated in the presence of potassium carbonate, using benzene as the reaction medium, to give the corresponding N-alkyl compound. The N-acyl compounds hereof are prepared from the piperidineacetic acid via prolonged contact with an appropriate acid chloride of the formula

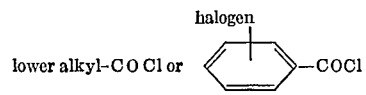

in the presence of aqueous sodium hydroxide. Similarly, contacting a cold solution of the piperidineacetic acid in aqueous sodium hydroxide with benzyl chloroformate, then allowing the reactants to stand for a while at room temperatures, affords the corresponding N-benzyloxycarbonyl compound, which is converted to the methyl ester by contacting in alcohol solution with ethereal diazomethane. The benzyloxycarbonyl group is thereupon removed by contacting with hydrogen bromide in acetic acid. From the resultant piperidineacetic acid methyl ester, on heating with an appropriate dialkylaminoalkyl halide and potassium carbonate in alcohol solution, the corresponding N-dialkylaminoalkyl compound eventuates. Substitution of the parent acid for the ester in this latter procedure affords the corresponding dialkylaminoalkyl ester of the N-dialkylaminoalkyl compound.

Conversion of the basic amines of this invention to acid addition salts proceeds by mixing a base with 1 to 3 equivalents, as indicated, of any of various inorganic and strong organic acids, the anionic portion of which conforms to T as hereinbefore defined.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) α,α-Diphenyl-4-pyridineacetamide

A mixture of 130 parts of α,α-diphenyl-4-pyridineacetonitrile and 460 parts of concentrated sulfuric acid is heated at around 90° for 6 hours, then poured onto 1500 parts of ice. The resultant mixture is made alkaline to litmus with aqueous 25% sodium hydroxide. The precipitate thrown down is filtered off, washed with water, and dried at 60° to give α,α-diphenyl-4-pyrodineacetamide melting at 225–230° with gas evolution.

(B) α,α-Diphenyl-4-piperidineacetamide hydrochloride

To a solution of 113 parts of α,α-diphenyl-4-pyridineacetamide in 800 parts of 95% ethanol is added 48 parts of concentrated hydrochloric acid. The resultant mixture is hydrogenated at approximately 3 atmospheres and 25° for 32 hours in the presence of 24 parts of platinum oxide. The mixture is then filtered, and the filtrate is concentrated to approximately ⅓ volume by vacuum distillation. Insoluble solids are isolated by filtration and consecutively washed with 95% ethanol and anhydrous ether.

The product thus isolated is α,α-diphenyl-4-piperidineacetamide hydrochloride sintering at approximately 213° and melting at 233–240° with gas evolution.

(C) α,α-Diphenyl-4-piperidineacetic acid hydrobromide ethanolate

A mixture of 50 parts of α,α-diphenyl-4-piperidineacetamide hydrochloride and 1000 parts of 48% hydrobromic acid is heated at the boiling point under reflux for 92 hours, then cooled to 0°. Insoluble solids are filtered out, washed with acetone, dried in air, and recrystallized from ethanol to give α,α-diphenyl-4-piperidineacetic acid hydrobromide ethanolate melting at approximately 151° with gas evolution. Heating in vacuo at around 130° drives off solvent of crystallization, affording α,α-diphenyl-4-piperidineacetic acid hydrobromide melting at approximately 295°.

(D) α,α-Diphenyl-4-piperidineacetic acid

Approximately 63 parts of α,α-diphenyl-4-piperidineacetic acid hydrobromide ethanolate is dissolved in 160 parts of ethanol and 200 parts of water. The solution is filtered. The filtrate is made just alkaline to litmus with concentrated ammonium hydroxide, then chilled. The precipitate thrown down is filtered off and washed with aqueous 50% ethanol to give α,α-diphenyl-4-piperidineacetic acid melting at approximately 315° with gas evolution. The product has the formula

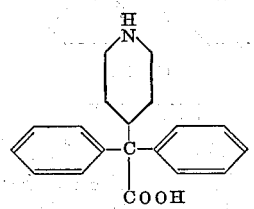

EXAMPLE 2

(A) α-(p-Chlorophenyl)-α-phenyl-4-pyridineacetonitrile

To a suspension of 19 parts of sodium amide in 150 parts of dioxan is added, during 10 minutes, a solution of 102 parts of α-(p-chlorophenyl)phenylacetonitrile in 200 parts of dioxan. The resultant mixture is heated at the boiling point under reflux for 4 hours, then cooled to around 90°, at which temperature a solution of 60 parts of 4-chloropyridine in 240 parts of dioxan is rapidly added. The mixture thus obtained is heated at the boiling point under reflux for 5 hours, then cooled, thoroughly washed with water, and extracted with 10% hydrochloric acid. The extract is washed with ether, then made alkaline to litmus with aqueous 25% sodium hydroxide. The precipitate thrown down is filtered off, washed with water, and dried at 60° to give α-(p-chlorophenyl)-α-phenyl-4-pyridineacetonitrile sintering at approximately 125° and melting at 135–137°.

(B) α-(p-Chlorophenyl)-α-phenyl-4-pyridineacetamide

Substitution of 130 parts of α-(p-chlorophenyl)-α-phenyl-4-pyridineacetonitrile for the α,α-diphenyl-4-pyridineacetonitrile called for in Example 1(A) affords, by the procedure there detailed, α-(p-chlorophenyl)-α-phenyl-4-pyridineacetamide sintering at approximately 204° and melting at 206–208°.

(C) α-(p-Chlorophenyl)-α-phenyl-4-piperidineacetamide

To a solution of 129 parts of α-(p-chlorophenyl)-α-phenyl-4-pyridineacetamide in 800 parts of aqueous 95% ethanol is added 48 parts of concentrated hydrochloric acid, followed by 24 parts of platinum oxide. The resultant mixture is hydrogenated at around 25° under 3 atmospheres for 32 hours, then stripped of solvent by vacuum distillation. The residue is taken up in water. The aqueous solution is made alkaline to litmus with concentrated ammonium hydroxide. The precipitate which forms is filtered off, washed with water, and dried in air to give α-(p-chlorophenyl)-α-phenyl-4-piperidineacetamide sintering at 184° and melting at 196–198°.

(D) α-(p-Chlorophenyl)-α-phenyl-4-piperidineacetic acid hydrobromide ethanolate

Substitution of 50 parts of α-(p-chlorophenyl)-α-phenyl-4-piperidineacetamide for the α,α-diphenyl-4-piperidineacetamide hydrochloride called for in Example 1(C) affords, by the procedure there detailed, α-(p-chlorophenyl)-α-phenyl-4-piperidineacetic acid hydrobromide ethanolate sintering at approximately 164° and melting at approximately 194° with gas evolution. The product has the formula

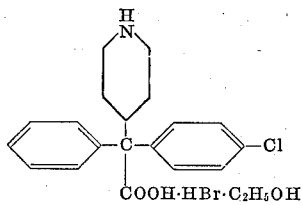

EXAMPLE 3

(A) α-(m-Chlorophenyl)-α-phenyl-4-pyridineacetonitrile

Substitution of 102 parts of α-(m-chlorophenyl)-phenylacetonitrile for the α-(p-chlorophenyl)phenylacetonitrile called for in Example 2(A) affords, by the procedure there detailed, α-(m-chlorophenyl)-α-phenyl-4-pyridineacetonitrile.

(B) α-(m-Chlorophenyl)-α-phenyl-4-pyridineacetamide

Substitution of 130 parts of α-(m-chlorophenyl)-α-phenyl-4-pyridineacetonitrile for the α-(p-chlorophenyl)-α-phenyl-4-pyridineacetonitrile called for in Example 2(B) affords, by the procedure there detailed, α-(m-chlorophenyl)-α-phenyl-4-pyridineacetamide.

(C) α-(m-Chlorophenyl)-α-phenyl-4-piperidineacetamide

Substitution of 129 parts of α-(m-chlorophenyl)-α-phenyl-4-pyridineacetamide for the α-(p-chlorophenyl)-α-phenyl-4-pyridineacetamide called for in Example 2(C) affords, by the procedure there detailed, α-(m-chlorophenyl)-α-phenyl-4-piperidineacetamide.

(D) α-(m-Chlorophenyl)-α-phenyl-4-piperidineacetic acid hydrobromide ethanolate

Substitution of 50 parts of α-(m-chlorophenyl)-α-phenyl-4-piperidineacetamide for the α-(p-chlorophenyl)-α-phenyl-4-piperidineacetamide called for in Example 2(D) affords, by the procedure there detailed, α-(m-chlorophenyl)-α-phenyl-4-piperidineacetic acid hydrobromide ethanolate, having the formula

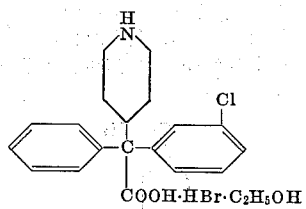

EXAMPLE 4

1-methyl-α,α-diphenyl-4-piperidineacetic acid

A mixture of 10 parts of α,α-diphenyl-4-piperidineacetic acid, 50 parts of 90% formic acid, and 50 parts of 36% formaldehyde is heated at around 90° for 3 hours, then stripped of solvent by vacuum distillation. Water and anhydrous ethanol are thereupon consecutively vacuum distilled from the residue in quantities sufficient to remove traces of formic acid and residual moisture. The residue is then recrystallized from anhydrous ethanol to give 1-methyl-α,α-diphenyl-4-piperidineacetic acid which, washed with additional anhydrous ethanol and dried at 60°, melts at approximately 275° with gas evolution. The product has the formula

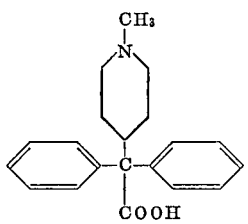

EXAMPLE 5

(A) 1-ethyl-α,α-diphenyl-4-piperidineacetic acid

A mixture of 33 parts of α,α-diphenyl-4-piperidineacetic acid, 17 parts of ethyl iodide, 15 parts of potassium carbonate, and 800 parts of benzene is heated at the boiling point under reflux with stirring for 6 hours, then chilled and filtered. The filtrate is stripped of solvent by vacuum distillation, leaving 1-ethyl-α,α-diphenyl-4-piperidineacetic acid as the residue.

(B) 1-ethyl-α,α-diphenyl-4-piperidineacetic acid hydrochloride

Approximately 10 parts of 1-ethyl-α,α-diphenyl-4-piperidineacetic acid is stirred into sufficient hot absolute ethanol to effect solution. The solution is acidified with hydrogen chloride dissolved in 2-propanol. Approximately 10 volumes of ether is introduced, and the precipitate which evenutates is isolated by filtration and recrystallized from a mixture of ethanol and ether to give 1-ethyl-α,α-diphenyl-4-piperidineacetic acid hydrochloride, having the formula

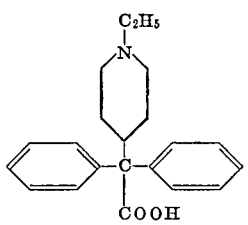

EXAMPLE 6

1-acetyl-α,α-diphenyl-4-piperidineacetic acid

To a solution of 50 parts of α,α-diphenyl-4-piperidineacetic acid hydrobromide ethanolate in 1000 parts of aqueous 10% sodium hydroxide is added 10 parts of acetyl chloride. The resultant mixture is stirred at room temperatures for 3 hours, then acidified with concentrated hydrochloric acid. Insoluble solids are filtered out, washed with water, and recrystallized from aqueous dimethyl sulfoxide to give 1-acetyl-α,α-diphenyl-4-piperidineacetic acid, having the formula

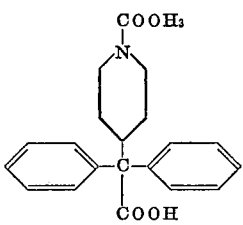

EXAMPLE 7

1-benzoyl-α,α-diphenyl-4-piperidineacetic acid

Substitution of 18 parts of benzoylchloride for the acetyl chloride called for in Example 6 affords, by the procedure there detailed, 1-benzoyl-α,α-diphenyl-4-piperidineacetic acid, having the formula

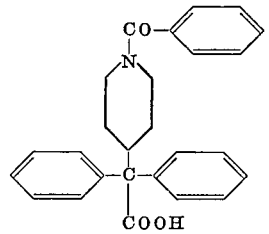

EXAMPLE 8

1-(p-chlorobenzoyl)-α,α-diphenyl-4-piperidineacetic acid

Substitution of 23 parts of p-chlorobenzoyl chloride for the acetyl chloride called for in Example 6 affords, by the procedure there detailed, 1-(p-chlorobenzoyl)-α,α-diphenyl-4-piperidineacetic acid which, dried in vacuo at 100°, sinters at approximately 225° and melts at 253–160° with gas evolution. The product has the formula

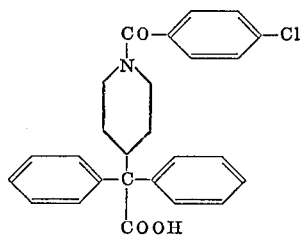

EXAMPLE 9

1-benzyloxycarbonyl-α,α-diphenyl-4-piperidineacetic acid

To a solution of 34 parts of α,α-diphenyl-4-piperidineacetic acid in 54 parts of aqueous 8% sodium hydroxide at approximately 0° is added, with vigorous stirring, 27 parts of benzyl chloroformate. A further 50 parts of aqueous 8% sodium hydroxide is thereupon stirred in, portionwise; and the resultant mixture is stirred and allowed to warm to room temperature during 15 hours. At this point, the aqueous phase is separated, washed with ether, acidified with hydrochloric acid, and extracted with ethyl acetate. The extract is washed with saturated aqueous sodium chloride, dried over calcium sulfate, and stripped of solvent by vacuum distillation. The residue is 1-benzyloxycarbonyl - α,α-diphenyl-4-piperidineacetic acid sintering at around 174° and melting at 176–181°. The product has the formula

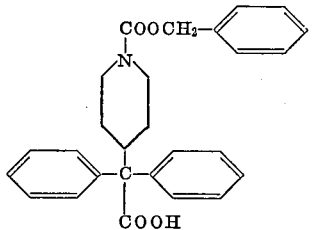

EXAMPLE 10

Methyl 1-benzyloxycarbonyl-α,α-diphenyl-4-piperidineacetate

To a suspension of 100 parts of 1-benzyloxycarbonyl-α,α-diphenyl-4-piperidineacetic acid in a mixture of 150 parts of methanol and 1500 parts of anhydrous ether is added a solution of 28 parts of diazomethane in 700 parts of anhydrous ether. The resultant mixture is allowed to stand at room temperatures for 16 hours, whereupon solvent is distilled off in vacuo and the residue partitioned between ether and aqueous 5% sodium hydroxide. The ethereal layer is separated, washed with water, dried over calcium sulfate, and stripped of solvent by vacuum distillation. The residual oil is methyl 1-benzyloxycarbonyl-α,α-diphenyl-4-piperidineacetate, having the formula

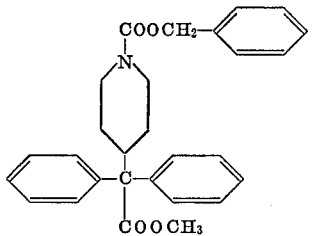

EXAMPLE 11

Methyl α,α-diphenyl-4-piperidineacetate hydrobromide

To a solution of 10 parts of methyl α,α-diphenyl-4-piperidineacetate hydrobromide in 20 parts of acetic acid is added 25 parts of a 40% solution of hydrogen bromide in acetic acid. The resultant mixture is allowed to stand at room temperatures for 1 hour, whereupon sufficient anhydrous ether is introduced to effect precipitation. The precipitate is filtered off, washed with anhydrous ether, dried at 60°, and recrystallized from aqueous 90% methanol to give methyl α,α-diphenyl-4-piperidineacetate hydrobromide sintering at approximately 245° and melting at approximately 265°. The product has the formula

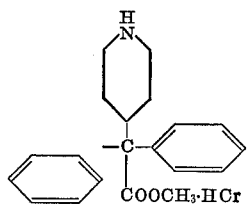

EXAMPLE 12

(A) Methyl 1-(2-diethylaminoethyl)-α,α-diphenyl-4-piperidineacetate

A mixture of 78 parts of methyl α,α-diphenyl-4-piperidineacetate hydrobromide, 27 parts of 2-diethylaminoethyl chloride, 80 parts of powdered anhydrous sodium carbonate, and 320 parts of butanol is heated with stirring at the boiling point under reflux for 22 hours, then chilled and filtered. The filtrate is stripped of solvent by vacuum distillation. The residue is partitioned between ether and water. The ethereal phase is separated, washed well with water, and extracted with 2% hydrochloric acid. The extract is made alkaline with ammonium hydroxide and thereupon extracted with ether. The extract thus obtained is dried over anhydrous potassium carbonate and freed of solvent by vacuum distillation to give methyl 1-(2-diethylaminoethyl)-α,α-diphenyl-4-piperidineacetate as the oily residue.

(B) Methyl 1-(2-diethylaminoethyl)-α,α-diphenyl-4-piperidineacetate dioxalate

To a solution of 50 parts of methyl 1-(2-diethylaminoethyl)-α,α-diphenyl-4-piperidineacetate in 750 parts of 2-propanol is added a solution of 23 parts of oxalic acid in 2000 parts of 2-propanol. The precipitate which forms is filtered off and recrystallized from a mixture of 90% 2-propanol and ether to obtain methyl 1-(2-diethylaminoethyl)-α,α-diphenyl-4-pyridineacetate dioxalate melting at 170–173° with gas evolution. The product has the formula

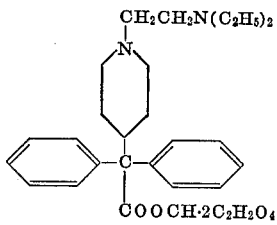

EXAMPLE 13

2-diethylaminoethyl 1-(2-diethylaminoethyl)-α,α-diphenyl-4-piperidineacetate

A mixture of 10 parts of α,α-diphenyl-4-piperidineacetic acid, 10 parts of 2-diethylaminoethyl chloride, 14 parts of sodium carbonate, 300 parts of ethanol, and 20 parts of water is heated with stirring at the boiling point under reflux for 42 hours. The mixture is then freed of solvent by vacuum distillation, and the residue is is partitioned between ether and water. The ethereal phase is separated, washed with water, and extracted with 10% hydrochloric acid. The extract is washed with ether, made alkaline with aqueous 25% sodium hydroxide, and extracted with dichloromethane. The dichloromethane extract is dried over potassium carbonate and stripped of solvent by vacuum distillation. The residual oil is dried at 110° in vacuo to give 2-diethylaminoethyl 1-(2-diethylaminoethyl)-α,α-diphenyl-4-piperidineacetate, having the formula

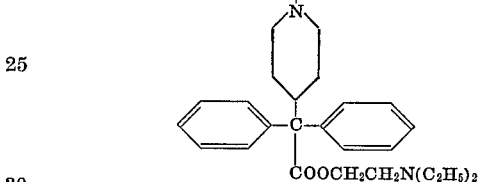

What is claimed is:

1. A compound of the formula

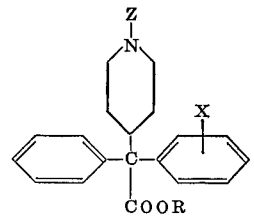

wherein Z represents hydrogen, lower alkyl, lower alkanoyl, benzoyl, chlorobenzoyl, benzyloxycarbonyl, or di(lower alkyl)aminoethyl; X represents hydrogen or chlorine; and R represents hydrogen, methyl, or di(lower alkyl aminoethyl.

2. A compound according to claim 1 having the formula

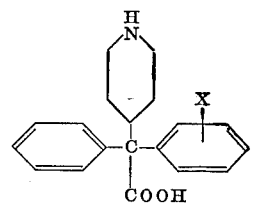

wherein X represents hydrogen or chlorine.

3. A compound according to claim 1 which is α-(p-chlorophenyl)-α-phenyl-4-piperidineacetic acid.

4. A compound according to claim 1 having the formula

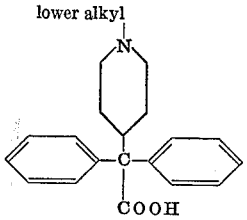

5. A compound according to claim 1 which is 1-methyl-α,α-diphenyl-4-piperidineacetic acid.

6. A compound according to claim 1 which is 1-benzyloxycarbonyl-α,α-diphenyl-4-piperidineacetic acid.

7. A compound according to claim 1 having the formula

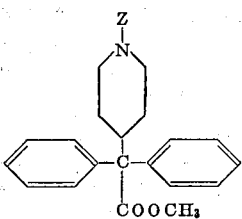

wherein Z represents hydrogen or di(lower alkyl)aminoethyl.

8. A compound according to claim 1 which is methyl α,α-diphenyl-4-piperidineacetate hydrobromide.

9. A compound according to claim 1 which is 2-diethylaminoethyl 1-(2-diethylaminoethyl)-α,α-diphenyl-4-piperidineacetate.

References Cited

UNITED STATES PATENTS

| | | | |
|---|---|---|---|
| 2,480,224 | 8/1949 | Cusic et al. | 260—482 |
| 2,507,631 | 5/1950 | Hartmann et al. | 260—294 |
| 3,128,277 | 4/1964 | Temple et al. | 260—294.3 |

OTHER REFERENCES

Gulati et al.: J. Pharm. 27 (7), 195–7 (1965).

HENRY R. JILES, Primary Examiner

G. T. TODD, Assistant Examiner

U.S. Cl. X.R.

260—294.3, 294.9; 424—267